United States Patent
Ham et al.

(10) Patent No.: US 6,401,994 B1
(45) Date of Patent: Jun. 11, 2002

(54) CONTRA-KEEPER

(76) Inventors: Joel R. Ham, 620 W. Moulton St., P.O. Box 751, Pontiac, IL (US) 61764; Jason M. Durham, 26 Lafayette, P.O. Box 353, Saunemin, IL (US) 61769

( * ) Notice: Subject to any disclaimer, the term of this patent is extended or adjusted under 35 U.S.C. 154(b) by 0 days.

(21) Appl. No.: 09/942,598

(22) Filed: Aug. 31, 2001

(51) Int. Cl.[7] .......................... B60R 9/06; E05G 1/024; E05G 1/06
(52) U.S. Cl. .......................... 224/315; 109/51; 224/328
(58) Field of Search .............................. 224/328, 309, 224/315; 109/51

(56) References Cited

U.S. PATENT DOCUMENTS

| | | | | |
|---|---|---|---|---|
| 7,101 A | * | 2/1850 | Hochstrasser | 109/51 |
| 2,677,338 A | * | 5/1954 | Sassetti | 109/51 |
| 2,754,777 A | * | 7/1956 | De Rosa, Sr. | 109/51 |
| 3,565,306 A | * | 2/1971 | Belokin, Jr. | 225/1 |
| 3,587,486 A | * | 6/1971 | Heinrichs | 109/23 |
| 4,253,595 A | | 3/1981 | Tiffany | |
| 4,406,387 A | | 9/1983 | Rasor | |
| 4,884,733 A | | 12/1989 | Geeves | |
| 5,673,646 A | | 10/1997 | Knudson | |
| 5,823,411 A | * | 10/1998 | Gronwoldt et al. | 220/210 |
| 6,082,272 A | * | 7/2000 | Adrain | 109/51 |
| 6,145,719 A | | 11/2000 | Robert | |

* cited by examiner

Primary Examiner—Stephen P. Garbe
(74) Attorney, Agent, or Firm—Patent & Trademark Services; Joseph H. McGlynn

(57) ABSTRACT

A vehicle mountable article carrier for use by law enforcement personnel to safely and securely store and transport weapons, contraband, evidence gathered from a crime scene, or the personal property of a person taken into custody. The vehicle mountable article carrier is a briefcase like device with an upper and lower cover. A plurality of individual lockable compartments are located within the lower cover. A plurality of vehicle attachment device having a bolt and a pivotal cap are used to secure the vehicle mountable article carrier to the trunk of the vehicle.

7 Claims, 2 Drawing Sheets

CONTRA-KEEPER

BACKGROUND OF THE INVENTION

This invention relates, in general, to an article carrier, and, in particular, to an article carrier which can be mounted on the trunk of a vehicle, and which has individual storage compartments.

DESCRIPTION OF THE PRIOR ART

In the prior art various types of vehicle mountable article carriers have been proposed. For example, U.S. Pat. No. 6,145,719 to Robert discloses a vehicle mountable gun and equipment case for the safe transportation of guns and equipment. The case is secured to the vehicle by means of a threaded fastener.

U.S. Pat. No. 4,884,733 to Greeves discloses a storage container for storing material in the trunk of a vehicle with dividers which divide the container into multiple compartments.

U.S. Pat. No. 5,673,646 to Knudson discloses a removable storage article attached to a boat transom.

U.S. Pat. No. 4,253,595 to Tiffany discloses a cargo carrier with a strap to secure it to the top of a vehicle.

U.S. Pat. No. 4,406,387 to Rasu discloses an article carrier which is secured to an exterior surface of a vehicle by a fastener which requires simultaneous application of a rotational force and a force normal to the surface.

SUMMARY OF THE INVENTION

The present invention is directed to a vehicle mountable article carrier. The vehicle mountable article carrier is a waterproof case with separate lockable compartments. The article carrying case has an upper cover with a top portion which has a perimeter and an upper perimeter wall. The upper perimeter wall extends down from the top portion.

The article carrying case also has a lower cover which has a bottom portion and a perimeter and a lower perimeter wall. The lower perimeter wall extends upward from the perimeter of the bottom portion. A space is defined between the lower perimeter wall and the bottom portion of the lower cover. A plurality of individual lockable compartments are insertable into this defined space.

The upper cover and the lower cover are hingedly attached. In addition, two hydraulic lid support members are attached to the upper and lower covers and are locked in position when the upper cover is open.

A weatherproof rubber gasket is attached to the perimeter of the lower perimeter wall to prevent moisture and debris from entering the vehicle mountable article carrier.

The vehicle mountable article carrier is also equipped with electric locking means and a battery powered light source. The locking means is used to secure the upper cover to the lower cover. The light source is located on the inside top portion of the upper cover.

A plurality of individual lockable compartments are insertable in the space provided in the lower cover. The compartments can be of various sizes from small to large, or a combination of both. Each lockable compartment is used to receive and store items which are being collected and/or transported by law enforcement.

A plurality of vehicle attachment means are adapted for attaching the vehicle mountable article carrier to the trunk of a vehicle. The attachment means has two parts, a bolt portion and a pivotal nut portion. The pivotal nut portion has a base portion and a top portion connected to the base portion through the use of a shaft. The top portion of the pivotal nut is able to rotate from an unlocked position to a locked position in order to rigidly attach the vehicle mountable article carrier to the trunk of a vehicle. The top portion of the pivotal nut portion is off-set from the base portion via the position of the connecting shaft. In addition, the top portion is bullet shaped and is knurled for easy gripping.

The lower, or bottom, portion of the base portion of the pivotal nut portion is equipped with a flanged edge. The bottom portion of the lower cover is equipped with a plurality of bores which enable the bottom portion of the lower cover to rest on the flanged edge when the vehicle mountable article carrier is mounted on the trunk of a vehicle.

It is an objective of the present invention to provide a new and improved means for law enforcement personnel to store and transport evidence obtained from a crime scene, such as weapons and other property of a person taken into custody by law enforcement personnel.

It is an objective of the present invention to provide a vehicle mountable article carrier which is easily attachable and detachable to the trunk of a law enforcement vehicle.

It is an objective of the present invention to provide a new and improved vehicle mountable article carrier which is light weight for ease of carrying when detached from the trunk of the vehicle, but yet, durable enough that, while attached to the trunk of the vehicle, articles may be safely and securely stored and transported.

These and other objects and advantages of the present invention will be fully apparent from the following description when taken in connection with the annexed drawings.

DESCRIPTION OF THE PREFERRED EMBODIMENTS

Figure 1:
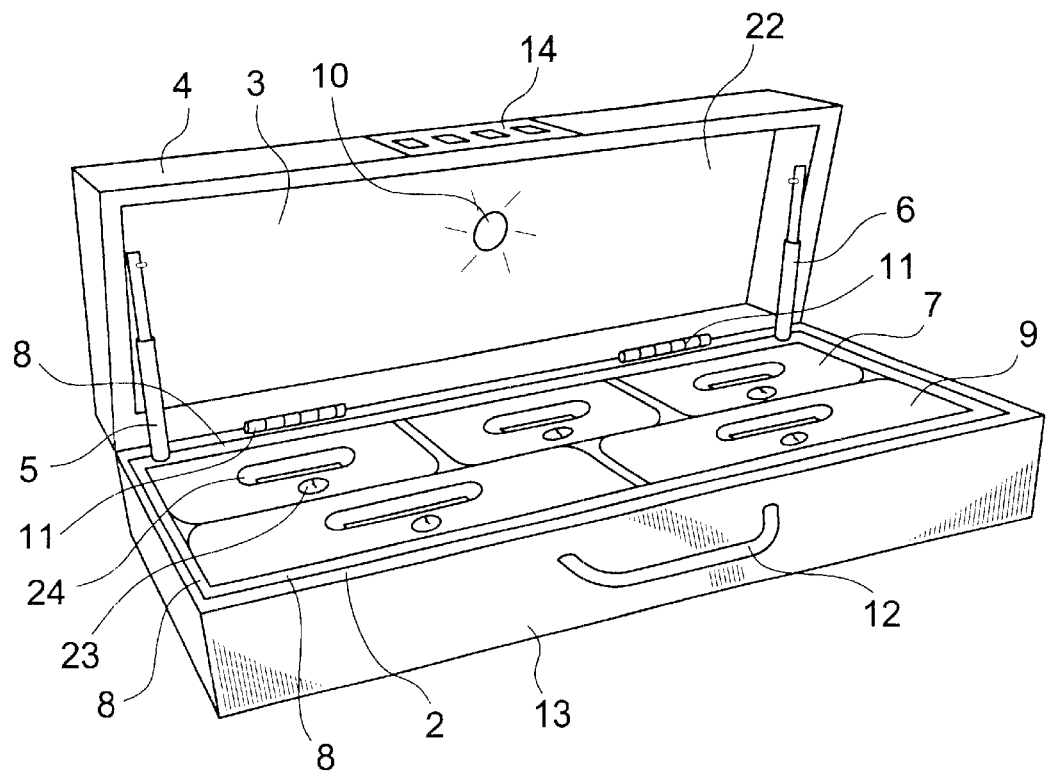
FIG. 1 is a perspective view of the vehicle mountable article carrier with the upper cover in the open position and displaying a plurality of individual lockable compartments.

Referring now to the drawing in greater detail, FIG. 1 shows a vehicle mountable article carrier 1 which is used to store and transport items while attached to the trunk of a law enforcement vehicle. The article carrier has an upper cover 3 with an upper perimeter wall 4 extending around the top portion 3. The article carrier also has a lower cover 13 and lower perimeter wall 2 extending lower cover 13. The upper cover 3 and lower cover 13 are hinged together by hinges 11 so that the upper and lower covers 3, 13 can be easily opened and closed. Two hydraulic lid support mechanisms 5 and 6 are attached to the upper and lower covers and hold the upper cover in the open position when the upper cover is unlocked and opened. A space is provided in the lower cover 13 for holding lockable compartments 7 and 9. It should be noted that five compartments 7, 9 are shown, however, this is merely for illustrational purposes, and fewer or more compartments can be provided without departing from the scope of the invention. Each container 7, 9 can have its own individual lock 23 and handle 24 if desired.

A weatherproof rubber gasket 8 is attached to the perimeter of the lower perimeter wall 2 to prevent moisture and debris from entering the article carrier when it is closed and locked. A battery powered light source 10 is attached to the inside portion of the upper cover 3. The light can have a manual on/off switch, or it could come on when the upper cover 3 is opened. Since both types of switch are conventional no description is necessary or will be given. A handle 12 is provided for lifting, carrying and transporting the article carrier by hand to a location after it is dismounted from the vehicle trunk.

The individual lockable compartments or containers 7, 9 are also removable. A foam padding 22 covers the inside of the upper cover 3 and lower cover 2. The padding will help secure the individual compartments to keep them from sliding around, if less than the full number of compartments are used. Also, the padding 22 will keep a full complement of compartments 7, 9 in place within the bottom portion 2.

An electric lock 14 is used to secure the upper cover 3 to the lower cover 2. The electric lock can be any conventional electric lock which will serve the intended function. Therefore, no further disclosure of the lock is necessary or will be given.

Figure 2:
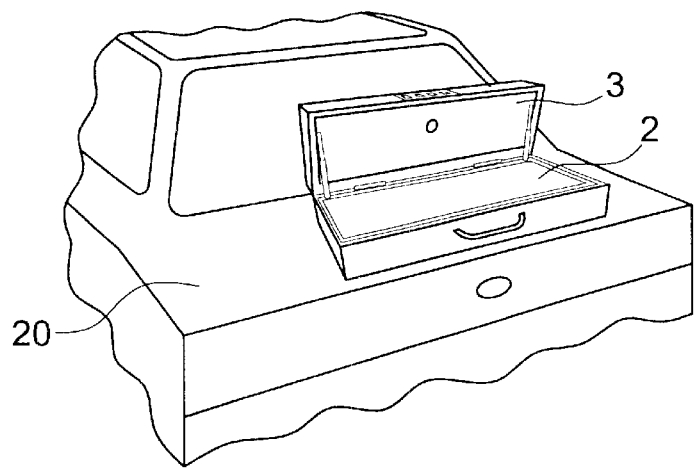
FIG. 2 is a perspective view of the vehicle mountable article carrier mounted on a police vehicle.

FIG. 2 shows the present invention 1 as it will be mounted on the top of the trunk lid 20 of a police vehicle. The present invention will be mounted by special bolts, as will be explained in detail below.

Figure 3:
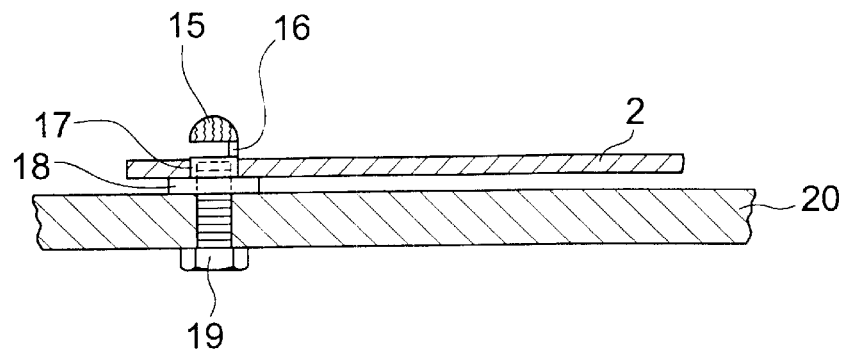
FIG. 3 is a cutaway side view of the vehicle mountable article carrier mounted on the trunk of a vehicle.
Figure 4:
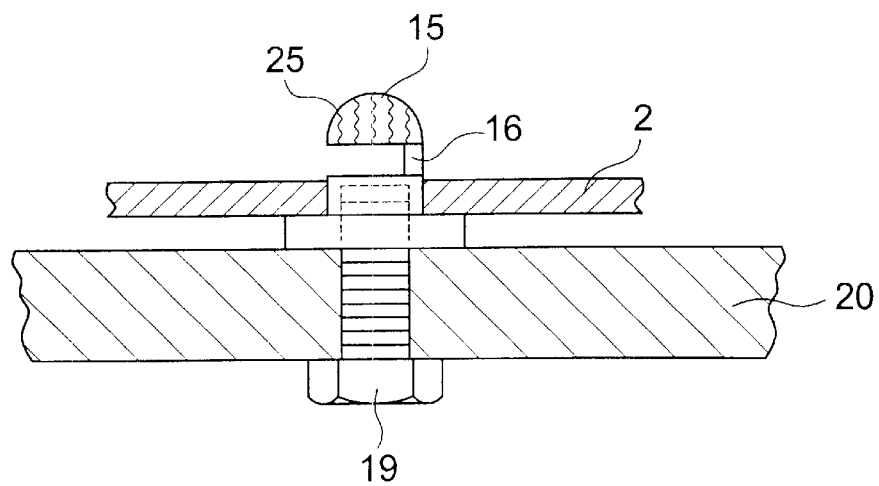
FIG. 4 is a cutaway side view of the bolt portion and the pivotal nut portion in the locked position.

As shown in FIG. 3, the vehicle attachment means has a threaded bolt 19 which is inserted from the underside of the trunk lid 20. The bolt 19 is threadedly connected to a nut 17 on the opposite side of the trunk lid 20. The nut 17 has a flange 18 which rests on the top surface of the trunk lid 20, and this arrangement secures the bolt and nut to the trunk lid. The top portion of the nut 17 fits through the bottom surface of the of the compartment 2 and has a pivoted cap 15 secured thereto by a pivot shaft 16. The cap 15 has a knurled surface 25 which makes it easier to turn the nut 15 from the open position shown in FIG. 4 to the locked position shown in FIG. 5.

In order to secure the article carrier 1 to the trunk lid 20, a user would attach the bolt 19 and the nut 17 to the trunk lid 20 with the flange 18 resting on the top surface of the trunk lid. Next, the user would pass holes, In the bottom of compartment 2, over the top of the nut 17 until the nut 17 and the cap 15 pass through the holes and emerge on the inside of the compartment 2. In order to do this, the cap 15 will have to be in the position shown in FIG. 4. Since the outside dimensions of the cap 15 and the nut 17 are the same size or slightly smaller than the holes in the bottom of compartment 2, the user will have no trouble aligning the various parts and passing the compartment 2 over the cap 15 and bolt 17.

Figure 5:
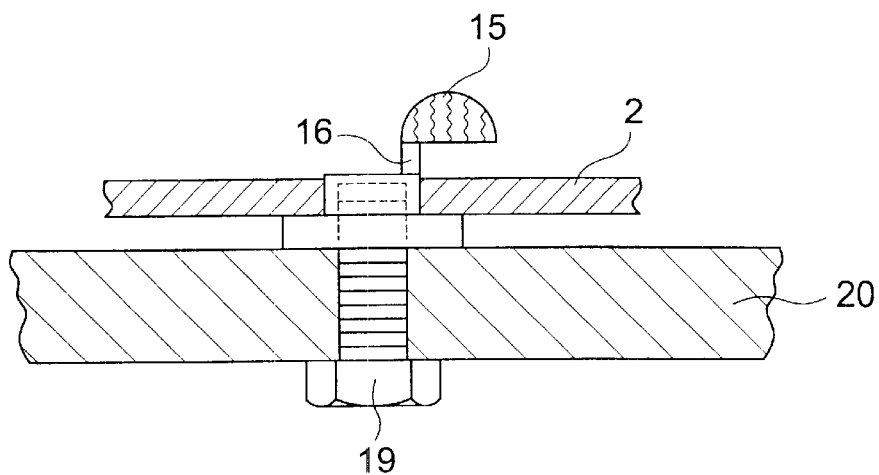
FIG. 5 is a cutaway side view of the bolt portion and the pivotal nut portion in the closed position.

Once the compartment 2 is in position, the user would grasp the cap 15 and rotate it about the pivot 16 to the position shown in FIG. 5. In this position, the outside dimension of the nut 17 and the cap 15 is too large to pass through the holes in the bottom of compartment 2. This will secure the compartment 2 to the trunk lid 20 of the vehicle. When the upper compartment 3 is closed and locked it will not be possible to rotate the cap 15 into the unlocked position. Unlocking the cap 15 can only be accomplished when the lid 3 is open. By opening the top 3 removing any containers 7, 9 to expose the caps 15, and then rotating the caps into the FIG. 4 position, the carrier 1 can be quickly and easily removed from the trunk lid 20. Also, it should be noted that only one bolt 19, nut 17 and cap 15 are shown in the drawings, however, in use a plurality of these items will be used to securely fasten the carrier 1 to the trunk lid 20.

Although the vehicle mountable article carrier and method of using the same has been described in the foregoing specification in detail, it is to be understood that modifications may be made to the invention which do not exceed the scope of the claims and modified forms of the present invention done by others skilled in the art to which the invention pertains will be considered infringements of this invention when those modification forms fall within the scope of this invention.

We claim:

1. A carrier adapted to be mounted to a vehicle,
    said carrier comprising:
        an upper portion and a lower portion,
        said upper and lower portion being hinged together so said upper and lower portions can be moved from an open position to a closed position,
        at least one removable container in said lower portion,
        at least one aperture extending through said lower portion,
        means for locking said upper and lower portions in a closed position, and
        means for securing said carrier to a vehicle,
    said means comprising:
        a fastener means for attaching said carrier to a portion of said vehicle,
        said fastener means having an upper end and a lower end,
        said upper end having a outer dimension which will pass through said at least one aperture,
        means on said upper end for increasing said outer dimension so said upper end is larger than said at least one aperture.

2. The carrier as claimed in claim 1, wherein said means on said upper end for increasing said outer dimension comprises a cap,
    said cap being pivoted to said upper end,
    said cap being movable from a first position to a second position, and
    when said cap is in said first position an outer dimension of said upper end and said cap is small enough to extend through said at least one aperture, and
    when said cap is in said second position an outer dimension of said upper end and said cap is too large to extend through said at least one aperture.

3. The carrier as claimed in claim 1, wherein said lower portion has a groove therein,
    said groove receiving a gasket to prevent fluid or debris from entering said carrier.

4. The carrier as claimed in claim 1, wherein said upper portion has a light secured to an inside surface.

5. The carrier as claimed in claim 4, wherein said light is battery powered.

6. The carrier as claimed in claim 1, wherein said upper and lower portions are lined with padding.

7. The carrier as claimed in claim 1, wherein said carrier has a plurality of removable containers, and
    some of said removable containers are different sizes.

* * * * *